Feb. 22, 1966     H. E. NEU ETAL     3,235,946
PROCESS OF FABRICATING PISTON HEADS
FOR HYDRAULIC BRAKE CYLINDERS
Filed Nov. 18, 1957
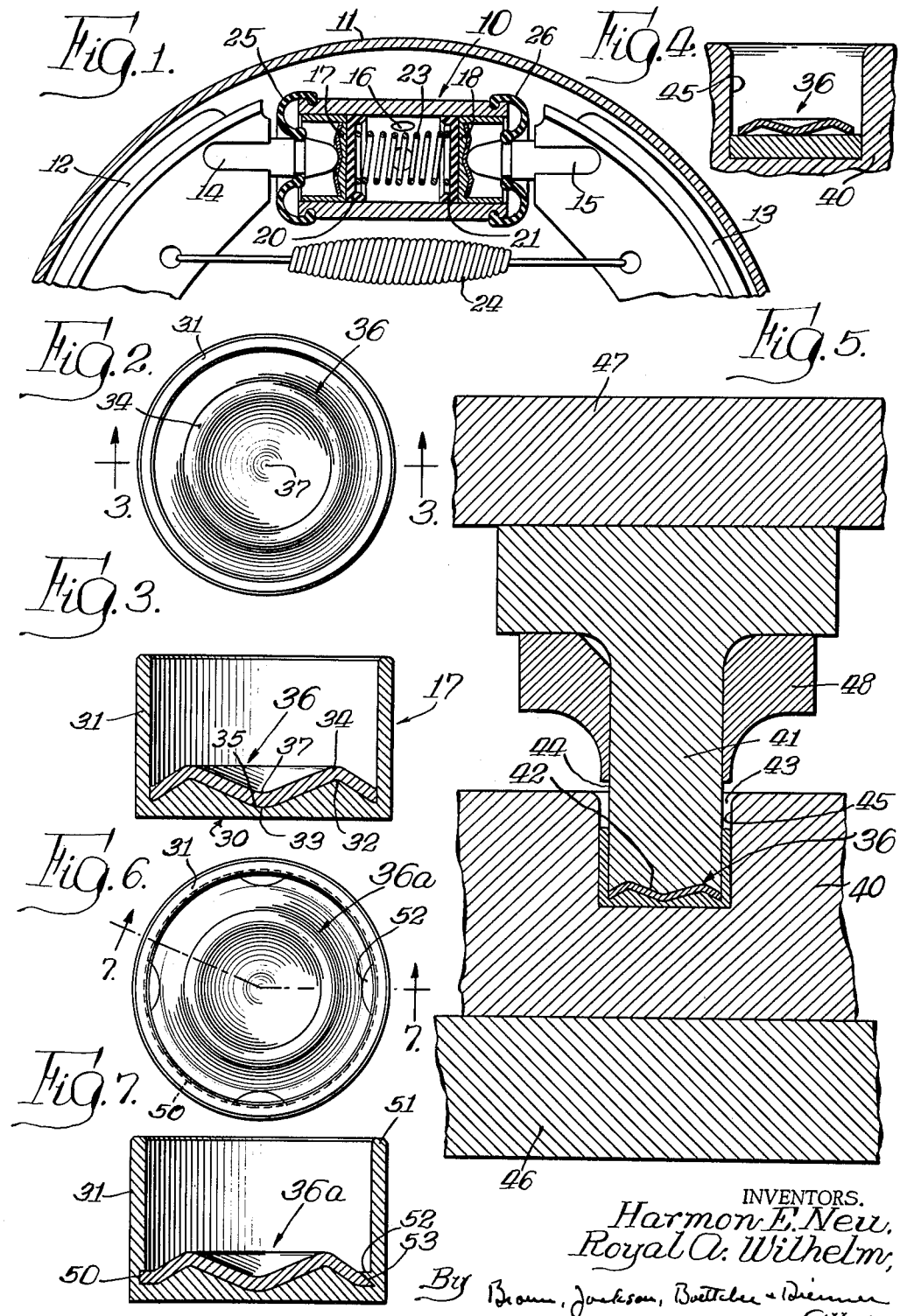
INVENTORS.
Harmon E. Neu.
Royal A. Wilhelm,

United States Patent Office 3,235,946
Patented Feb. 22, 1966

3,235,946
PROCESS OF FABRICATING PISTON HEADS FOR HYDRAULIC BRAKE CYLINDERS
Harmon E. Neu, Elkhart, and Royal A. Wilhelm, New Paris, Ind., assignors to Star Machine, Inc., Elkhart, Ind., a corporation of Indiana
Filed Nov. 18, 1957, Ser. No. 697,167
1 Claim. (Cl. 29—156.5)

This invention relates, in general, to the forming of metals, to a new and improved method of forming a hydraulic piston and, in particular, to a new and improved method of forming a piston particularly adaptable for use in the hydraulic brake mechanism of motor vehicles.

Heretofore, in hydraulic pistons for actuating the brake shoes of motor vehicles, it is conventional to use an aluminum piston formed by casting, grinding and the like or by forming an automatic screw machine from aluminum bar stock. With present day increases in braking needs, and particularly with the advent of power actuated brakes, it has been found that the conventional aluminum pistons cannot withstand the forces imposed upon them. Consequently, numerous attempts have been made to improve such aluminum pistons, such as by thickening the head of the piston, by thickening the walls thereof, by thickening and tapering the inner walls thereof, by placing strengthening ribs between the head and the walls, by adding other materials, etc., all of which have been unsatisfactory since such expediencies did not sufficiently strengthen the pistons and break down still occurred. Furthermore, such expediencies were especially deficient since they increased the expense of such a large mass production item, which is critical.

Accordingly, it is a general object of this invention to provide a method of manufacturing hydraulic pistons which are particularly useful in the motor vehicle brake systems.

We contemplate accomplishing the general objects of this invention by the provision of a slug or blank preferably a relatively thick, cylindrical, aluminum piece, forming the piston by impact extruding a relatively thin insert member, preferably of steel, into the aluminum slug whereby the insert member causes the aluminum to flow around its edges and to form the walls of the piston, the steel insert member being actually thereby embedded in the head of the piston. This insert thus forms a steel backed head for the piston and provides the piston head with sufficient strength to withstand the pressures in the present and future motor vehicle hydraulic brake cylinders.

This manner of forming a piston is also important because it provides a means of stamping, or impact extruding, a piece of aluminum to form a relatively inexpensive, yet operable and durable steel-reinforced aluminum motor vehicle hydraulic brake piston. It differs from existing steel-backed aluminum pistons in that the insert member is actually a part of the aluminum. Too, by our process, the insert also, in itself, forms a part of the piston forming means.

Still another object of our invention is a new method of manufacture of articles of extruded metal whereby an insert member of more hard metal itself forms a means of impact extruding and forming a reinforced article.

Still another object of our invention is a new method of manufacture of aluminum articles whereby a steel insert member itself forms a means of impact extruding a steel-backed aluminum article.

Other and more particular objects of our invention will be apparent to those skilled in the art from the following description and drawings forming a part hereof and wherein:

FIG. 1 is a fragmentary, sectional view of a typical installation of our piston constructed in accordance with the teachings of our invention in a motor vehicle brake;

FIG. 2 is a plan view of our improved piston showing the interior thereof;

FIG. 3 is a cross-sectional view of the piston shown in FIG. 2 taken along lines 3—3 and looking in the direction of the arrows;

FIG. 4 is a fragmentary, cross-sectional view of the blank or slug and the steel insert in a closed die prior to the impact extrusion process;

FIG. 5 is a fragmentary, sectional view showing the slug and the insert member after having been formed into the piston by the press;

FIG. 6 is a plan view of another arrangement of our piston showing indentations and the like illustrated by way of example in an insert member which forms a peripheral groove in the side wall of the piston and is filled by the flowable metal to further aid in embedding the steel insert in the piston head; and FIG. 7 is a cross-sectional view of the piston taken along lines 7—7 of FIG. 6 and looking in the direction of the arrows.

Turning now to the drawings, and in particular, to FIG. 1 thereof, there is disclosed, fragmentarily, the working parts of the cenventional wheel brake of a motor vehicle with which our improved piston is typically installed. The wheel brake comprises generally a brake cylinder, indicated in its entirety as 10, disposed in a brake drum 11 and connected to a pair of brake shoes 12 and 13 by operation of a pair of push-rods 14 and 15. Push-rods 14 and 15 are in turn actuated by hydraulic fluid introduced into a centrally located cylinder inlet 16 from a master cylinder (not shown) whereby upon actuation of the foot pedal (not shown) in the motor vehicle, the two oppositely acting pistons 17 and 18 are urged outwardly. In this manner, the respective brake shoes 12 and 13 are forced against the drum 11 to slow or stop the motor vehicle in the conventional manner. Suitable sealing cups 20 and 21 prevent leakage of hydraulic fluid out of the cylinder and are respectively urged against the heads of the respective pistons 17, 18 by a helical compression spring 23, and the assembly is further provided with a suitable return spring 24 and resilient covers 25 and 26, all of which are conventional. Since the construction and general operation of this type of brake assembly is well-known, no further description thereof is deemed necessary herein; our improved piston being illustrated therein for the purposes of showing the operation thereof in a conventional motor vehicle brake.

As hereinbefore explained, our invention contemplates a new and improved article of manufacture and the method of manufacturing the same and in particular a new and improved brake piston and a method of making the same, which piston is particularly useful in motor vehicle brakes as depicted in FIG. 1. In that figure, there is shown two such new brake pistons 17 and 18.

As more clearly shown enlarged in FIGS. 2 and 3, for the purposes of explanation, the piston, such as 17, comprises a relatively flat surface forming the head 30 and relatively thin cylindrical side wall 31. The head 30 is provided with a torus-shaped ridge 32 and indentation 33 which complements a torus-shaped indentation 34 and peak 35 on an insert member, indicated in its entirety as 36. As more clearly depicted in FIG. 3, the insert member 36, preferably of steel or some other relatively hard metal, such as for example—hardened aluminum—being relatively thin, has a centrally located indentation 37 which automatically forms the ridges 34 and the peak 35 to complement the piston. The indentation 37 has for its primary purpose the centering of the respective push rods 13 and 15 in the brake cylinder as can be seen in FIG. 1.

It is to be noted in FIG. 3 that the outer periphery of the insert 36 is the same or substantially the same as the inner periphery of the side wall 31 of the piston, and the inner contour of the head conforms precisely with the contour of the one side of the insert member 36 with which it is contiguous, the transfer of forces between the insert member and the head are distributed throughout. This differs from known types of insert members having pistons of irregular contour where slight misfits or misalignments form peak points of force in operation tending to ultimately destroy the brake piston.

Turning now more particularly to the method of forming an article of manufacture and in particular, our new and improved brake piston, reference is made to FIGS. 4 and 5 where there is illustrated a relatively thick aluminum slug or blank generally cylindrical in contour which has been formed by being punched from an aluminum stock and suitably shaved or otherwise machined to remove all ragged edges so that it fits precisely in the closed cylindrical die 40. Thus inserted, the pre-formed steel insert member 36 of lesser outer diameter than the outer diameter of the aluminum slug is placed centrally and on top of the aluminum slug as illustrated in FIG. 4. Then, a punch 41 (FIG. 5), cylindrical in form and having its end complementary to the contour of one side of the steel insert member as illustrated at 42, is pressed with sufficient swiftness and impact to plasticize the aluminum slug whereby the aluminum flows upwardly, as shown in the drawings, along the annular space 43 between the periphery 44 of the punch and the periphery 45 of the die. In this manner, the steel insert 36, which in this process forms a part of the press forming means, becomes embedded, is impacted or is forged to the inner side of the piston. It is to be noted that in FIG. 5, we have illustrated the preferred manner of forming the piston in that the outer diameter of the punch 41 is equal to or substantially equal to the outer diameter of the steel insert member 36 to form wall 31. In operation, a suitable base 46 for the die 40 and a suitable press 47 are provided. After our improved brake piston is formed, a suitable ejector mechanism 48, slidable with respect to the punch 41, operates to remove the piston from the punch.

By this impact extrusion process, our motor vehicle power brake piston is greatly improved by having homogeneous grain packing, reduced porosity and with no cross grain condition as with machining nor any stretching of the metal as in the drawings; all of which contribute to an improvement of pistons of this type in conditions required of them.

Turning now to FIGS. 6 and 7, we have illustrated therein another type of brake piston having aids in maintaining a steel insert in contiguous relationship with the head of the piston, which aids may be necessary or desirable in certain applications. Such aids include a peripheral indentation or groove 50 in the inner side wall 31a to receive the margin of a steel insert member 36a. This peripheral indentation or groove 50 is formed in the process above described where the outer diameter of the insert member 36a is greater than the outer diameter of the punch 41 and where during the process, the aluminum is caused to flow upwardly. Since the outer diameter of the insert 36a is larger than the punch 41, the ejector 48 is utilized (in this process as an additional step) to hammer or form the top of groove 50 by bringing the ejector 48 against the top edge 51 of the wall 31a and swaging the insert member 36a while the piston is still within the die 40. With movement of the die 40, the ejector 48 can then proceed to eject the piston in the usual manner.

Another aid in maintaining the insert member contiguous with the head of the piston is the formation of the plurality of indentations 52 (four shown) of any selected shape having inclined side walls 53, which during the process, first described above, will cause the metal to flow upwardly and inwardly along the inclined surface 53 to fill the indentations. If necessary or desirable, the further step, utilizing the ejector 48 to swage or fill the indentations may be practiced. Any number of such indentations 52 may be provided as desired and while we have shown the indentations 52 in connection with the piston having the peripheral groove 50, obviously, such indentations could form a part of the embodiment shown in FIGS. 2 and 3 equally as well.

While we have shown and described a steel backed aluminum piston and the method of manufacturing the same by the impact extrusion process whereby the aluminum is plasticized and caused to flow up the side of the punch, it is obvious that this process could be used for any other article of manufacture where a reinforced relatively soft extrudable material is desired. Also, where we have shown and described a cylindrical piston with a cylindrical inner portion and relatively flat head surface, obviously, any size or shape of the inner and outer surfaces can be made by this process, the outstanding feature of our invention being that we use an insert member, in part, to shape the article being made and to form part of and be embedded in the final article as a reinforcing means.

Furthermore, while we have found that it is preferred to use aluminum of the type known on the market as type 1100—a standard sold by the leading aluminum manufacturers and is said to be 90% aluminum with no alloys added—other aluminum may be used, and, in certain applications, other malleable material, such as magnesium and certain copper alloys may be used. However, such latter material may require pre-heating to be impact extrudable.

Finally, while we have shown and described the aluminum slug as having a relatively flat top surface as illustrated in FIG. 4, it is obvious that the insert member could be slightly indented to center the insert member, or, alternatively, the punch 41 could be magnetized so as to hold the insert member 36 prior to the impact extruding process to form the piston. Also, while we have shown the forming of the side walls 31 by the flow of the aluminum in a direction opposite to the punch 41 during the pressing operation, obviously, the die 42 could be made to move against the stationary punch 41 so that the flow of metal was in the same direction as the movement of the die if desired.

Wherein the various parts of our invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claim which should be construed as broadly as the prior art will permit.

We claim:

A process of fabricating cup-shaped pistons having a disc-shaped wear resistant and strengthening insert in the bottom thereof from a disc-shaped metal slug of relatively soft material and preformed metal insert of lesser diameter than said slug and of a relatively hard material having a protrusion on one face and a recess on the other face complementary to and in the same relative location as said protrusion for receiving an actuating link, comprising placing said insert on said slug with the protrusion in contact therewith, axially aligning said insert and said slug, confining said slug on the bottom and sides in a die cavity, pressing said protrusion by a plunger of less diameter at the contact end than said insert into the contacting face of said slug initially and thereafter forcing the metal of said slug and insert into face to face contact from said protrusion radially outwardly to expel the air from between said slug and insert, thereafter forcing said plunger and insert into said slug to effect backward extrusion of the slug onto the marginal portion of said other face of said insert exposed adjacent the plunger, and continuing said plunger movement to elongate the marginal edge of said slug to form a cylindrical side wall portion.

References Cited by the Examiner

UNITED STATES PATENTS

| | | |
|---|---|---|
| 1,007,372 | 10/1911 | Miller. |
| 1,570,320 | 1/1926 | Serewicz _____ 29—520 XR |
| 1,720,722 | 7/1929 | Dean. |
| 1,752,982 | 4/1930 | Herold _____ 29—522 XR |
| 1,802,843 | 4/1931 | Singer. |
| 1,835,863 | 12/1931 | Greve _____ 29—156.5 |
| 1,848,083 | 3/1932 | Wetherald. |
| 2,244,954 | 6/1941 | Lenz et al. _____ 29—156.5 |
| 2,638,390 | 5/1953 | Neeme _____ 309—4 |
| 2,673,769 | 3/1954 | Morrison et al. _____ 309—4 |
| 2,778,494 | 1/1957 | Kreidler. |
| 2,795,467 | 6/1957 | Colwell. |
| 2,908,073 | 10/1959 | Dulin _____ 29—493 XR |

FOREIGN PATENTS

| | | |
|---|---|---|
| 823,002 | 10/1937 | France. |
| 497,270 | 12/1938 | Great Britain. |
| 56,849 | 8/1944 | Netherlands. |

WHITMORE A. WILTZ, *Primary Examiner.*

KARL J. ABRACHT, *Examiner.*